US011725128B2

(12) United States Patent
O'Dwyer et al.

(10) Patent No.: US 11,725,128 B2
(45) Date of Patent: Aug. 15, 2023

(54) IMPREGNATION SEALANT FOR ELECTRONIC COMPONENTS

(71) Applicant: Henkel AG & Co. KGaA, Duesseldorf (DE)

(72) Inventors: Patrick O'Dwyer, Dublin (IE); Greg Clarke, Wicklow (IE); Peter Joseph Wrobel, Dublin (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/904,300

(22) Filed: Jun. 17, 2020

(65) Prior Publication Data
US 2020/0317973 A1 Oct. 8, 2020

Related U.S. Application Data

(63) Continuation of application No. PCT/EP2018/086026, filed on Dec. 19, 2018.

(60) Provisional application No. 62/776,147, filed on Dec. 6, 2018, provisional application No. 62/607,452, filed on Dec. 19, 2017.

(51) Int. Cl.
*C08F 220/18* (2006.01)
*C08F 220/28* (2006.01)
*C08K 5/3467* (2006.01)
*C09K 3/10* (2006.01)
*C08K 5/3492* (2006.01)
*C08F 220/34* (2006.01)
*C08F 220/30* (2006.01)

(52) U.S. Cl.
CPC ........ *C09K 3/1021* (2013.01); *C08K 5/34924* (2013.01); *C08F 220/281* (2020.02); *C08F 220/301* (2020.02); *C08F 220/346* (2020.02); *C09K 2003/1065* (2013.01); *C09K 2200/0625* (2013.01)

(58) Field of Classification Search
CPC ...... C09K 3/1021; C09J 4/06; C08F 290/141; C08F 290/147; C08F 220/281; C08F 220/301; C08F 220/1811; C08F 220/346; C08F 220/20
See application file for complete search history.

(56) References Cited

U.S. PATENT DOCUMENTS

| | | | | |
|---|---|---|---|---|
| 4,216,134 A * | 8/1980 | Brenner | ................ | C08F 263/08 524/879 |
| 4,380,613 A | 4/1983 | Nativi | | |
| 5,041,508 A * | 8/1991 | Haruna | ...................... | C09J 4/00 526/329 |
| 6,172,134 B1 * | 1/2001 | Cooke | ...................... | C09K 3/12 523/209 |
| 6,761,775 B1 * | 7/2004 | Newberth, III | .......... | C09K 3/10 134/4 |
| 2007/0021533 A1 | 1/2007 | Yan et al. | | |
| 2008/0251195 A1 * | 10/2008 | Malofsky | .................... | C09J 5/00 525/360 |
| 2009/0045008 A1 * | 2/2009 | Fisk | ........................ | B32B 27/28 156/332 |
| 2012/0129994 A1 * | 5/2012 | Birkett | ............... | C08G 18/3844 524/358 |

FOREIGN PATENT DOCUMENTS

| | | | | |
|---|---|---|---|---|
| CN | 106978114 A | 7/2017 | | |
| EP | 0 377 927 A1 | 7/1990 | | |
| JP | 2003301020 A | * 10/2003 | .......... | C08F 290/067 |
| JP | 2003301020 A | 10/2003 | | |
| JP | 2007039669 A | 2/2007 | | |
| WO | 2005105857 A1 | 11/2005 | | |

OTHER PUBLICATIONS

Machine translation into English of Fujita et al (JP 2003-301020A) (Year: 2003).*
Loctite Brochure "The Seal of Quality", Reliable Sealing Results from High-Quality Impregnantion Products and Services, Apr. 2017, Copyright Henkel AG & Co. KGaA, 2017. Relevance—p. 14, bottom table "Loctite IS 5100", formerly known as Flexseal 5100.

* cited by examiner

*Primary Examiner* — Karuna P Reddy
(74) *Attorney, Agent, or Firm* — Mary K. Cameron

(57) ABSTRACT

The present invention relates to an anaerobically curable impregnation sealant composition and methods thereof containing a (meth)acrylic monofunctional monomer with a hydrophobic moiety, a (meth)acrylic monofunctional monomer with a hydroxyl group, a modified polyester urethane methacrylate resin having a weight average molecular weight of from about 8000 to about 18000 g/mol, and triallylisocyanurate, triallylcyanurate, or derivatives thereof, or a combination thereof. The present invention particularly relates to a sealant composition for impregnation to plastic and metal substrates that also provides resistance to thermal cycling.

31 Claims, No Drawings

IMPREGNATION SEALANT FOR ELECTRONIC COMPONENTS

FIELD OF THE INVENTION

The present invention relates generally to impregnation sealant compositions and methods thereof for electronic components, comprising curable acrylic monomers and resins adapted for curing by a substantial absence of oxygen. More specifically, the invention relates to an impregnation sealant composition for sealing between two dissimilar substrates such as metal and plastic, while having superior resistance to thermal shock and thermal cycling.

BACKGROUND TO THE INVENTION

Impregnation sealing of porous substrates is frequently carried out by introducing sealant compositions into porosities under a pressure differential by well-known techniques, or by wicking methods in which the impregnation sealant is flowed across the surface of a porous part and allowed to enter the voids thereof by capillary action during a selected period.

Such impregnation sealing is typically used in the manufacture of porous metal parts and other porous materials to avoid problems such as corrosion. Zinc, copper, iron, aluminum, brass and various other alloys are among the common metals to be sealed. Such problems include air, gas and fluid leakage susceptibility, which may create processing or finishing problems, as well as difficulties in the end use of the porous member. Sealing of pores is employed to render parts leak-proof and to minimize risk of corrosion.

Conventional impregnation sealant compositions may be self-curing anaerobic sealants, thermal curing sealants and sealants which cure by both anaerobic and heat cure mechanisms.

For anaerobic impregnation sealants, (meth)acrylic resins are particularly useful due to their highly advantageous viscosity characteristics and rapid curability. Once impregnated into the substrates, anaerobic sealants in the absence of air automatically self-cure to a fully polymerized state. Sealant remaining on outside part surfaces is exposed to air and will remain in liquid form until it is washed off.

For electronic components, anaerobic impregnation is advantageous for several reasons. Components can cure at room temperature, and therefore eliminate the need for high temperature curing, such as in a hot water bath. Bleedout of sealant is minimal with anaerobic sealants, so fouling of parts does not occur and sealing performance is consistently high.

Commercially available anaerobic impregnation sealing compositions are unable to withstand thermal cycling and thermal shock between dissimilar surfaces such as plastic and metal. Thermal cycling is when a cured formulation is cycled between hot and cold temperatures, such as between −40 and +150° C. Thermal shock is when the thermal cycling is rapid, such as 30 second intervals between hot and cold temperatures.

As electronic components are becoming more integral for manufacturing of metal components, improved liquid impregnation sealants (LIS) are required to withstand thermal cycling and thermal shock for sealing between dissimilar substrates. For example, when metal parts are involved in electronic applications, such as in electronic control units for engine transmissions, such units contain plastic molded over the metal parts that require sealing to withstand exposure to transmission and hydraulic fluids and temperature variations.

A further problem exists with dissimilar substrates and its ability to impregnate between metal and plastic substrates while maintaining sufficient adhesion.

Accordingly, it would be a significant advance in the art to provide a curable anaerobic sealant composition having superior adhesion to plastic and metal substrates, while also maintaining bonding through thermal cycling and thermal shock.

SUMMARY OF THE INVENTION

The present invention provides such an impregnation sealant that can provide a curable anaerobic sealant composition having superior adhesion to plastic and metal substrates. The present invention also provides superior resistance thermal cycling and thermal shock.

In one aspect of the invention, there is provided an anaerobically curable composition which includes at least an anaerobically curable impregnation sealant composition including:
  (a) at least one (meth)acrylic monofunctional monomer containing a $C_4$-$C_{20}$ hydrophobic moiety;
  (b) at least one (meth)acrylic monofunctional monomer containing a hydroxyl group;
  (c) at least one modified polyester urethane methacrylate resin having a weight average molecular weight of from about 8000 to about 18000 g/mol; and
  (d) triallylisocyanurate, triallylcyanurate, or derivatives thereof, or a combination thereof.

According to another aspect, the present invention provides a method of manufacturing an anaerobically curable composition comprising:
  a) providing (a) at least one (meth)acrylic monofunctional monomer containing a hydrophobic moiety and (b) at least one (meth)acrylic monofunctional monomer containing a hydroxyl group; and
  b) combining said monomers with (c) at least one modified polyester urethane methacrylate resin having a weight average molecular weight of from about 8000 to about 18000 g/mol and (d) triallylisocyanurate, triallylcyanurate, or derivatives thereof, or a combination thereof.

According to another aspect, the present invention provides an anaerobically curable composition which includes at least an anaerobically curable impregnation sealant composition including:
  (a) at least one (meth)acrylic monofunctional monomer containing a $C_4$-$C_{20}$ hydrophobic moiety;
  (b) at least one (meth)acrylic monofunctional monomer containing a hydroxyl group; and
  (c) at least one modified polyester urethane methacrylate resin having a weight average molecular weight of from about 8000 to about 18000 g/mol.

According to another aspect, the present invention provides an anaerobically curable impregnation sealant composition comprising: triallylisocyanurate, triallylcyanurate, or derivatives thereof, or a combination thereof.

According to another aspect, the present invention provides an article of manufacture impregnated with a heat curable composition according to the above, with the article being a porous metal surface and a plastic surface.

Other features and aspects of the subject matter are set forth in greater detail below.

DETAILED DESCRIPTION OF THE INVENTION

The present invention provides an anaerobically curable composition that overcomes the drawbacks of conventional sealant compositions for electronic components. Specifically, the inventive sealant compositions provide a curable anaerobic liquid impregnation sealant composition that impregnates into gaps of plastic molded over metal. The compositions of the present invention avert problems of other liquid impregnation sealants when applied to plastic and metal substrates, by having enough flexibility in the cured sealant to survive thermal cycling and thermal shock, while also retaining sufficient adhesion to plastic and metal substrates. The present invention provides these advantages while still retaining excellent sealant properties.

The composition of the present invention includes at least one (meth)acrylic monofunctional monomer containing a $C_4$-$C_{20}$ hydrophobic moiety; at least one (meth)acrylic monofunctional monomer containing a hydroxyl group; at least one modified polyester urethane methacrylate resin having a weight average molecular weight of from about 8000 to about 18000 g/mol; and at least one triallylisocyanurate, triallylcyanurate, or derivatives thereof, or a combination thereof.

Other components may also be added to the composition including but not limited to catalyst capable of initiating free-radical cure of the composition, other co-monomer species, reactive diluents, pigments, surfactants, fillers, polymerization inhibitors, stabilizers, anti-oxidants, anti-corrosion additives, heat cure initiators, plasticizers and combinations thereof.

(Meth)acrylate Monomers

The sealant composition of the present invention includes a mixture of (meth)acrylate monomers containing $C_4$-$C_{20}$ hydrophobic moieties and (meth)acrylate monomers containing a hydroxyl. The sealant can also contain polyfunctional (meth)acrylic monomers and low viscosity reactive diluents.

(Meth)acrylate Monofunctional Monomers Containing a Hydrophobic Moiety

Hydrophobic moieties include monomers containing a $C_4$-$C_{20}$ alkyl groups. The $C_4$-$C_{20}$ alkyl (meth)acrylate monomer refers to an alkyl (meth)acrylate monomer having an alkyl group from 4-20 carbon atoms. The term "alkyl" refers to saturated aliphatic groups including linear, branched, cyclic, and acyclic groups. Additional hydrophobic moieties include those containing one or more aromatic rings. Such hydrophobic moieties serve as a component in the matrix to enhance plastic impregnation.

Examples of $C_4$-$C_{20}$ linear alkyl groups include but not limited to butyl (meth)acrylate, pentyl (meth)acrylate, hexyl (meth)acrylate, heptyl (meth)acrylate, octyl (meth)acrylate, nonyl (meth)acrylate, decyl (meth)acrylate, undecyl (meth)acrylate, dodecyl (meth)acrylate (i.e. lauryl (meth)acrylate), tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate.

Examples of $C_4$-$C_{20}$ branched alkyl groups include but not limited to isobutyl (meth)acrylate, isopentyl (meth)acrylate, isohexyl (meth)acrylate, isoheptyl (meth)acrylate, isooctyl (meth)acrylate, 2-ethylhexyl (meth)acrylate, sec-butyl (meth)acrylate, 1-methylbutyl (meth)acrylate, and 1-ethylpropyl (meth)acrylate.

Examples of $C_4$-$C_{20}$ cyclic groups include but not limited to cyclopropyl (meth)acrylate, cyclobutyl (meth)acrylate, cyclopentyl (meth)acrylate, cyclohexyl (meth)acrylate, cyclooctyl (meth)acrylate, trimethylcyclohexyl (meth)acrylate, and isomers thereof.

Examples of the monofunctional (meth)acrylate having a saturated alicyclic group include isobornyl (meth)acrylate, t-butylcyclohexyl (meth)acrylate, and dicyclopentanyl (meth)acrylate. Examples of the monofunctional (meth)acrylate having an unsaturated alicyclic group include dicyclopentenyloxyethyl (meth)acrylate.

The monofunctional (meth)acrylate hydrophobic moieties can also include moieties having an aromatic ring. Examples of the monofunctional (meth)acrylate having an aromatic ring include phenoxyethyl (meth)acrylate and 2-hydroxy-3-phenoxypropyl (meth)acrylate.

In an embodiment, particularly useful (meth)acrylate monomers containing hydrophobic moiety are a combination of $C_6$-$C_{12}$ alkyls and/or moieties having an aromatic ring. Even more preferably, particularly useful (meth)acrylate monomers containing hydrophobic moiety are a combination of one or more $C_6$-$C_{12}$ alkyls, and even more preferably a combination of one or more $C_8$-$C_{12}$ alkyls.

In an embodiment, the (meth)acrylate monomer containing a hydrophobic moiety is selected from the group consisting of 2-ethylhexyl (meth)acrylate, lauryl (meth)acrylate, trimethylcyclohexyl (meth)acrylate, isobornyl (meth)acrylate, phenoxyethyl (meth)acrylate, and combinations thereof.

In an embodiment, the amount by weight of the uncured sealant composition of (meth)acrylate monomers containing a hydrophobic moiety is from about 10 to about 20%, preferably from about 20 to about 60% by weight, even more preferably from about 25 to about 55% by weight based on the total weight of the sealant composition.

Monofunctional (Meth)acrylic Monomers Containing a Hydroxyl Group (Meth)acrylate monomers containing at least one hydroxyl group are employed in the present invention to provide intermolecular attraction in the cured polymer and produce a more durable seal with a metal substrate. Such monomers include hydroxyalkyl(meth)acrylates, the ethoxylated and/or propoxylated derivatives thereof, the adducts thereof with lactones, polyalkoxy monohydroxy mono(meth)acrylates. Particularly preferred are hydroxyalkyl(meth)acrylates having from $C_1$ to $C_{10}$ carbon atoms in the alkyl group, the ethoxylated and/or propoxylated derivatives thereof, the adducts thereof with lactones, and polyalkoxy monohydroxy mono(meth)acrylates thereof.

Examples of such monomers include hydroxyethyl(meth)acrylate, hydroxypropyl(meth)acrylate, hydroxybutyl(meth)acrylate, hydroxypentyl (meth)acrylate, hydroxyheptyl (meth)acrylate, hydroxynonyl(meth)acrylate, hydroxydecyl (meth)acrylate, their position isomers, the ethoxylated and/or propoxylated derivatives thereof, the adducts thereof with lactones, diethylene glycol mono(meth)acrylate, polyethylene glycol mono(meth)acrylate, propylene glycol mono(meth)acrylate, polypropylene glycol mono(meth)acrylate.

In one embodiment, the (meth)acrylic monomer containing a hydroxyl group is selected from the group consisting of hydroxyethyl methacrylate (HEMA), hydroxypropyl methacrylate (HPMA), and combinations thereof.

According to the present invention, the amount of (meth)acrylate monomers containing a hydroxyl group is from about 3 to about 45% by weight, preferably from about 5 to about 40% by weight, even more preferably from about 8 to about 35% by weight based on the total weight of the sealant composition.

Preferred compositions according to the present invention are further characterized by a reaction weight ratio of equivalents of the (meth)acrylate monomers containing a hydroxyl group to (meth)acrylate monomers containing a hydrophobic moiety is generally about 1:1 to about 1:6. Desirably, the preferred reaction ratio is 1:1 to about 1:2.

Polyfunctional (Meth)acrylic Monomers

The sealant composition can also contain polyfunctional (meth)acrylate monomers. These polyfunctional (meth) acrylate monomers produce cross-linked polymers, which increases polymer toughness, modulus and sealant durability.

Examples include di- or tri-functional (meth)acrylates such as polyethylene glycol di(meth)acrylates, tetrahydrofuran (meth) acrylates and di(meth)acrylates, hydroxypropyl methacrylate ("HPMA"), hexanediol di(meth)acrylate, trimethylol propane trimethacrylates ("TMPTMA"), diethylene glycol dimethacrylate, triethylene glycol dimethacrylates ("TRIEGMA"), tetraethylene glycol di(meth)acrylates, dipropylene glycol di(meth)acrylates, di-(pentamethylene glycol) di(meth)acrylates, tetraethylene diglycol di(meth) acrylates, diglycerol tetra(meth)acrylates, tetramethylene di(meth)acrylates, ethylene di(meth)acrylates, neopentyl glycol di(meth)acrylates, and bisphenol-A mono and di(meth)acrylates, such as ethoxylated bisphenol-A (meth)acrylate ("EBIPMA"), and bisphenol-F mono and di(meth)acrylates, such as ethoxylated bisphenol-A (meth) acrylate. Particularly preferred are triethylene glycol dimethacrylates.

According to the present invention, the amount of polyfunctional (meth)acrylate monomers is from about 0 to about 20% by weight, preferably from about 0 to about 10% by weight, even more preferably from about 0 to about 5% by weight based on the total weight of the sealant composition.

Modified Polyester Urethane (Meth)acrylate Resin

The present invention contains one or more modified polyester urethane (meth)acrylate resin, with a backbone of a polyester or polyether. The use of such polyester urethane (meth)acrylate resins has been found to significantly improve the adhesion of the cured sealant formulation between two dissimilar substrates by providing high flexibility that allows for movement caused by differing thermal expansion of the metal and plastic substrates.

The modified polyester urethane acrylate resin of the instant composition is formed by reacting a polyester diol with toluene diisocyanate to form a resin, and further reacting that product with a polymerizable methacrylate acid ester recited above. In an embodiment, the modified polyester urethane (meth)acrylate is formed in a reaction between a polyester diol with toluene diisocyanate (TDI), and further reacting that product with HEMA or HPMA.

In an embodiment, the polyester diol is poly(3-methyl-1, 5-pentanediol adipate). Other polyester diols useful are formed by the reaction of neopentyl glycol with a diol adipate of more than 3 carbon e.g., 1,4-butanediol adipate.

The reaction ratio of the equivalent weights of the polyester diol to the TDI should generally be in the range of about 1.0 to 4.0 parts of polyester diol to about 1.0 to about 4.0 parts of toluene diisocyanate. The preferred reaction ratio is about 2 parts TDI to about 1 part polyester diol. This ratio yields a composition with a chemical structure having a high degree of flexibility and stability.

Materials capable of being utilized as the modified polyester urethane (meth)acrylate resin component of the present invention are also described in published United States application U.S. Pat. No. 4,380,613, incorporated herein by reference in its entirety. Commercially available resins include EBECRYL 230, (Allnex, Belgium).

The sealant composition should contain sufficient (meth) acrylate-functionalized resin and/or monomer to have a high enough molecular weight to provide a flexible backbone. The resin should also be present at a low enough level to allow for a viscosity that is acceptable for impregnation.

According to the present invention, the polyester urethane (meth)acrylate resin, with a backbone of a polyester resin, has a weight average molecular weight (MW) of from about 8000 to about 18000, more preferably from about 10000 to about 17000, and most preferably from about 12000 to about 16000.

In an embodiment, the resin also has a glass transition temperature less than −20° C., preferably less than −30° C., and more preferably less than −40° C.

In a sealant composition, the amount of polyester urethane (meth)acrylate resin will vary depending upon the particular polyester urethane (meth)acrylate resin selected, but typically will be from about 5 to about 40% by weight, preferably from about 10 to about 30% by weight, even more preferably from about 15 to about 25% by weight based on the total weight of the sealant composition.

The reaction ratio of the equivalent by weight of the polyester urethane (meth)acrylate resin to (meth)acrylic monomers containing a hydrophobic moiety and (meth) acrylic monofunctional monomers containing a hydroxyl group is about 1:0.5 to about 1:6. Desirably, the preferred ratio being in the range of 1:3 to about 1:5.

Isocyanurates

The present invention contains one or more isocyanurates or their derivatives. The use of such isocyanurates alters the flexibility, temperature resistance, thermal shock and thermal cycling performance, and the bond strength of the composition. The isocyanurates may participate in the polymerization reaction.

Of the isocyanurates, triallylisocyanurate, triallylcyanurate, or derivatives thereof are particularly desirable.

Triallyl Cyanurate is represented by the following formula:

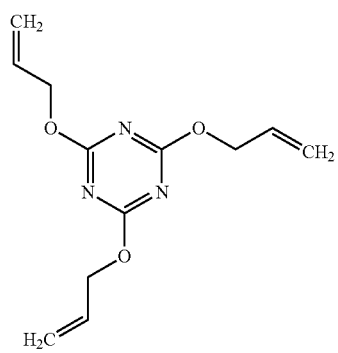 [SMILES: C=CCOc1nc(OCC=C)nc(OCC=C)n1]

Triallyl Isocyanurate is represented by the following formula:

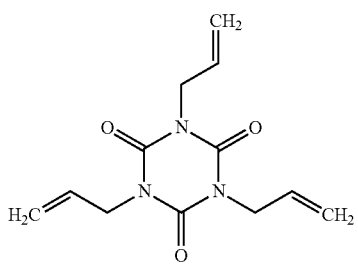 [SMILES: C=CCn1c(=O)n(CC=C)c(=O)n(CC=C)c1=O]

In the compositions described herein the amount of isocyanurates can be modified to adjust the flexibility, temperature resistance, thermal shock and thermal cycling performance, and the bond strength of the composition. For example, the isocyanurates are included in the composition in an amount from about 1 to about 20% by weight, preferably about 5% to 15% by weight, more preferably about 10% by weight based on the total weight of the sealant composition.

Initiator/Accelerators

The sealants of the present invention may be anaerobically curable through a free-radical mechanism, with an initiator being present therein, or an initiator system comprising a redox polymerization initiator (i.e., an ingredient or a combination of ingredients which produce an oxidation-reduction reaction, resulting in the production of free radicals).

Suitable initiators include peroxy materials, e.g., peroxides, hydroperoxides, and peresters, which are capable of inducing polymerization of the sealant compositions in the substantial absence of oxygen, and yet not induce polymerization as long as oxygen is present. Organic hydroperoxides are the desirable peroxy materials with t-butyl hydroperoxide and cumene hydroperoxide being particularly useful with the anaerobic-curing compositions. In a preferred embodiment, the sealant composition contains a room temperature cure initiator.

In addition to initiator components, sealants useful with the present invention may include various initiator accelerators, as for example hydroperoxide decomposition accelerators, when hydroperoxides are used as cure initiators in the sealant material. Typical examples of potentially suitable accelerators include: tertiary amines such as tributyl amine; sulfimides such as benzoic sulfimide (or saccharin); formamide; and compounds containing transition metals, such as copper octanoate.

When a peroxy polymerization initiator is employed in the impregnation sealant composition, such initiator typically does not comprise more than about 10% by weight of the composition, and preferably does not comprise more than about 5% of the composition by weight. Most preferably, the peroxy polymerization initiator used in compositions of the invention comprises from about 0.1 to about 5% by weight, preferably from about 0.5 to about 3% by weight, even more preferably from about 1 to about 2.5% by weight based on the total weight of the sealant composition. The weight percent of peroxy polymerization initiator typically is not below about 0.1%, since below that rate the cure rate becomes unsuitably low.

The composition may contain conventional additives, such as: other reactive diluents, pigments, adhesion promoters, fluorescing agents, surfactants, fillers, polymerization inhibitors, stabilizers, antioxidants, anticorrosion additives, heat cure initiators, plasticizers and the like. Such additives may include from about 0.1 to about 20 percent by weight based on the weight of the sealant composition product, and preferably not more than 20%.

The sealants of the present invention may be anaerobically curable through a thermally initiated free-radical mechanism, with an initiator being present therein, or an initiator system comprising a heat activated redox polymerization initiator (i.e., an ingredient or a combination of ingredients which produce an oxidation-reduction reaction upon exposure to elevated temperatures, resulting in the production of free radicals).

Preparation Procedure

In preparation of the compositions of the present invention, the (meth)acrylic monofunctional monomers and polyester urethane methacrylate resin and the cyanurates are blended or mixed with a catalyst capable of initiating free-radical cure.

Subsequently, the sealant composition is impregnated into the pores of the part to be sealed by either dry vacuum-pressure, internal pressure, wet vacuum-pressure and wet vacuum.

For the vacuum pressure process, the material is placed in an autoclave and a vacuum is drawn to evacuate the air in the pores. The liquid sealant composition is introduced while the parts are still under vacuum. The liquid polymerizes to form a tough thermoset polymer that permanently seals the pores. After the impregnation cycle the material is removed from the autoclave, the surface is then rinsed with water, leaving no evidence or film of the impregnating material on the surface of the material.

Thermal Cycling/Sealing Performance

Sealant compositions that impregnate dissimilar substrates ideally should withstand thermal cycling in excess of 1000 hours, with 30 minutes at each temperature with a transition time of 1 minute or less between temperatures.

Cured properties of the composition before thermal cycling preferably exhibit a sealing ability of 2 bar air pressure on impregnated parts. After 1000 thermal cycling between −40 and +150° C., with 30 minutes at each temperature with a transition time of less than 1 minute between temperatures, a sealing ability of 2 bar air pressure on impregnated parts should be maintained.

Viscosity

The viscosity of the impregnation sealant composition of the uncured invention suitably does not exceed about 100 mPa·s, and preferably such viscosity is less than 50 mPa·s, even more preferably between about 5 mPa·s to 35 mPa·s. The viscosity of the combination of (meth)acrylic monofunctional monomers alone should not exceed 30 mPa·s, even more preferably between about 1 mPa·s to 25 mPa·s, even more preferably 2 mPa·s to 15 mPa·s.

As used herein, viscosity values are those measured on a Haake Rotovisco 1, using a C60 1° Ti L Cone at a measurement speed of 1000 $s^{-1}$ at 25° C.

Dissimilar Materials

The sealant composition can seal between dissimilar materials, including metal and plastic. The composition is particularly useful when dissimilar materials have a coefficient of thermal expansion (CTE) mismatch of about 10 ppm/K to about 50 ppm/K.

Metals include copper, iron, bronze, brass, aluminum, zinc, magnesium, steel, nickel, sintered metal, as well as other metals and alloys thereof.

Plastic materials can include polyacetal (POM), polypropylene (PP), polyamide (PA), polybutylene terephthalate (PBT), polyphenylene sulfide (PPS), polyether ether ketone (PEEK), polyether sulfone (PES), polyarylate (PAR), polyamide-imide (PAI), or polytetrafluoroethylene (PTFE) and fiber filled equivalents.

Such dissimilar materials can be made by die castings, sand castings, investment castings, pressure castings, powdered metal parts, injection molding as well as forgings or weldments.

Electronic Applications

Potential electronic applications include connectors, wires, capacitors, cable harness, sensors, solenoids, coils, and other parts where dissimilar materials create interfacial leak paths.

Applications of the sealant composition includes sealing against leakage of coolants, lubricants, fuels, hydraulic fluids, air and other fluids in automotive powertrains, steering systems, air conditioning and other components.

The sealing of porosity can also be used as a preparatory step for plating and coating operations and for improving machinability of dissimilar parts, such as plastic and powdered metal parts.

Definitions

As used herein, the term "(meth)acrylic copolymer" refers to methacrylic copolymer and acrylic copolymer both. As used herein, the term "(meth)acrylate" refers to methacrylate and acrylate both.

As used herein, the term "Tg" refers to the glass transition temperature of a polymer. This is defined as the temperature at which the amorphous domains of the polymer take on the brittleness, stiffness, and rigidity characteristic of the glassy state. For polymers, this temperature is typically determined by DSC (differential scanning calorimetry).

As used herein, the term "weight average molecular weight" refers to a particular measure of the molecular weight of a polymer. The weight average molecular weight is calculated as follows: determine the molecular weight of a number of polymer molecules; add the squares of these weights; and then divide by the total weight of the molecules. The weight average molecular weight can be measured by gel permeation chromatography according to EN ISO 13885, using a polystyrene standard for calibration.

The invention may be further understood with reference to the following non-limiting examples. Percent weights are per the total composition unless otherwise specified.

EXAMPLES

Comparative Example

In this example, FLEXSEAL 5100 (LOCTITE), a polyester urethane methacrylate with a MW of 4000 g/mol, and a Tg of −31.2° C. was applied and cured within a nickel plated brass pin/glass reinforced polyphenylene sulphide body multiplug assembly. After curing the composition was subjected to thermal cycling of −40 to +150° C., 30 minutes at each temperature with a transition time of less than 1 minute between temperatures. The multiplug was tested for resistance to leakage by application of 2 bar air pressure before and after the thermal cycling.

Example 1

In this example a polyester urethane (meth)acrylate resin is combined with methacrylate monomers, adhesion promoters, and other components described below in the table.

Resistance to leakage is measured on nickel plated brass pin/glass reinforced polyphenylene sulphide body multiplug.

| Material | % by Weight |
|---|---|
| (Meth)acrylate monomers | 37 |
| HEMA | 10 |
| Phenoxyethyl (Meth)acrylates | 19 |
| IBOMA (isobornyl (meth)acrylate) | 8 |
| Modified polyester urethane (meth)acrylate resin, Tg = 45.2° C., MW = 15000 g/mol | 56 |
| Adhesion Promoters | 2 |
| Saccharin | 0.3 |
| Fluorescing Agent | 0.02 |
| Hydroperoxide | 2 |
| Activator stabilizer | 0.04 |
| Others | 2.64 |
| Total | 100 |

After curing the composition was subjected to thermal cycling of −40 to +150° C., 30 minutes at each temperature with a transition time of less than 1 minute between temperatures. Resistance to leakage was measured on nickel plated brass pin/glass reinforced polyphenylene sulphide body multiplugs by application of 2 bar air pressure. After 1000 cycles the assemblies leaked at 2 bar, indicating failure of the sealant.

Example 2

In this example the quantity of resin has been reduced to make the viscosity more suitable for the general impregnation process. Lauryl methacrylate and trimethylcyclohexyl methacrylate were added to supplement the monomer system in order to improve wetting of the plastic and improve material compatibility. The formulation had a viscosity of 25-30 mPa·s, which is ideally suitable for the impregnation process.

| Material | % by Weight |
|---|---|
| (Meth)acrylate monomers | 75 |
| HEMA | 27 |
| EHMA (2-ethylhexyl (meth)acrylate) | 17 |
| Trimethylcyclohexyl MA | 6 |
| Lauryl MA | 20 |
| IBOMA (isobornyl (meth)acrylate) | 6 |
| Modified polyester urethane (meth)acrylate resin Tg = −45.2° C., MW = 15000 g/mol | 18 |
| Saccharin | 0.3 |
| Fluorescing Agent | 0.02 |
| Hydroperoxide | 1.9 |
| Activator Stabilizer | 0.04 |
| Others | 3.74 |
| Total | 100 |

After curing the composition was subjected to thermal cycling of −40 to +150° C., 30 minutes at each temperature with a transition time of less than 1 minute between temperatures. Resistance to leakage was measured on nickel plated brass pin/glass reinforced polyphenylene sulphide body multiplugs by application of 2 bar air pressure. After 1000 cycles the assemblies leaked at 2 bar, indicating failure of the sealant.

Example 3

In this example triallylcyanurate was added to improve performance. The formulation had a viscosity of 25-30 mPa·s, which is ideally suitable for the impregnation process.

| Material | % by Weight |
| --- | --- |
| (Meth)acrylate monomers | 70 |
| HEMA | 24 |
| EHMA (2-ethylhexyl (meth)acrylate) | 16 |
| Trimethylcyclohexyl MA | 6 |
| Lauryl MA | 18 |
| IBOMA (isobornyl (meth)acrylate) | 6 |
| Triallylcyanurate | 10 |
| Modified polyester urethane (meth)acrylate resin Tg = −45.2° C., MW = 15000 g/mol | 16 |
| Saccharin | 0.3 |
| Fluorescing Agent | 0.02 |
| Hydroperoxide | 1.7 |
| Activator Stabilizer | 0.04 |
| Others | 1.94 |
| Total | 100 |

After curing the composition was subjected to thermal cycling of −40 to +150° C., 30 minutes at each temperature with a transition time of less than 1 minute between temperatures. Resistance to leakage was measured on nickel plated brass pin/glass reinforced polyphenylene sulphide body multiplugs by application of 2 bar air pressure. After 1000 cycles the assemblies did not leak 2 bar, indicating successful performance of the sealant after thermal cycling.

What is claimed:

1. An anaerobically curable impregnation sealant composition comprising:
   (a) at least two (meth)acrylic monofunctional monomers containing a $C_4$-$C_{20}$ alkyl hydrophobic moiety, wherein (a) comprises lauryl (meth)acrylate and trimethylcyclohexyl (meth)acrylate;
   (b) at least one (meth)acrylic monofunctional monomer containing a hydroxyl group;
   (c) at least one modified polyester urethane methacrylate resin having a weight average molecular weight of from about 8000 to about 18000 g/mol and a glass transition temperature of less than ~20° C., present in an amount ranging from about 10 to 30 wt. % based on total weight of the composition, wherein the amount of (c) is selected such that viscosity of the composition is suitable for impregnation; and
   (d) triallylisocyanurate, triallylcyanurate, or derivatives thereof, or a combination thereof, present in an amount of about 5 to 15 wt. % based on total weight of the composition.

2. The composition of claim 1, wherein (a) the (meth) acrylic monofunctional monomers containing the hydrophobic moiety further comprises one or more monomers having $C_6$-$C_{12}$ alkyl groups.

3. The composition of claim 1, wherein (a) the (meth) acrylic monofunctional monomer containing the hydrophobic moiety further comprises monomer selected from the group consisting of 2-ethylhexyl (meth)acrylate, isobornyl (meth)acrylate, cyclohexyl(meth)acrylate, tetrahydrofurfuryl (meth)acrylate, and combinations thereof.

4. The composition of claim 1, wherein (b) is a hydroxyalkyl(meth)acrylate having from $C_1$ to $C_{10}$ carbon atoms in the alkyl group.

5. The composition of claim 1, wherein (b) is selected from the group consisting of hydroxyethyl methacrylate (HEMA), hydroxypropyl methacrylate (HPMA), and combinations thereof.

6. The composition of claim 1, wherein (c) wherein the polyester urethane methacrylate resin has a weight average molecular weight of from 12000 to 18000 g/mol.

7. The composition of claim 1, wherein (d) is triallylisocyanurate or a derivative thereof.

8. The composition of claim 1, wherein (d) is triallylcyanurate or a derivative thereof.

9. The composition of claim 1, wherein (d) is included in the composition in an amount of about 10 wt. % based on the total weight of the composition.

10. The composition of claim 6 wherein (c) the modified polyester urethane methacrylate resin has a glass transition temperature less than −30° C.

11. The composition of claim 6, wherein (c) the modified polyester urethane methacrylate resin has a glass transition temperature less than −40° C.

12. The composition of claim 1, wherein (c) the modified polyester urethane methacrylate resin is a reaction product between polyester diol and toluene diisocyanate.

13. The composition of claim 1, wherein a reaction weight ratio of equivalents of (meth)acrylate monomers containing a hydroxyl group to (meth)acrylate monomers containing a hydrophobic moiety is about 1:1 to about 1:6.

14. The composition of claim 1, wherein a reaction weight ratio of equivalents of the modified polyester urethane (meth)acrylate resin to (meth)acrylic monomers containing a hydrophobic moiety and (meth)acrylic monofunctional monomers containing a hydroxyl group is about 1:0.5 to about 1:6.

15. The composition of claim 1 further comprising (f) at least one catalyst capable of initiating free-radical cure of the composition.

16. The composition of claim 1 further comprising (e) a polyfunctional monomer.

17. The composition of claim 1, wherein (c) has a glass transition temperature less than −40° C.; (d) is included in the composition in an amount of about 10 wt. % based on the total weight of the composition and viscosity of the uncured sealant composition is less than 50 mPa·s.

18. An anaerobically curable impregnation sealant composition comprising:
   (a) at least two (meth)acrylic monofunctional monomers containing a hydrophobic moiety, wherein (a) comprises lauryl (meth)acrylate and trimethylcyclohexyl (meth)acrylate;
   (b) at least one (meth)acrylic monofunctional monomer containing a hydroxyl group, and is present in an amount from about 3 to about 45 wt. % based on total weight of the composition;
   (c) at least one modified polyester urethane methacrylate resin having a weight average molecular weight of from about 8000 to about 18000 g/mol, a glass transition temperature of less than −40° C., and present in an amount ranging from about 10 to 30 wt. % based on total weight of the composition; and
   (d) triallylisocyanurate, triallylcyanurate, or derivatives thereof, or a combination thereof; and
   wherein (c) the at least one modified polyester urethane methacrylate resin comprises the reaction product of reactants:
   (i) a polyester diol,
   (ii) toluene diisocyanate, and
   (iii) a polymerizable methacrylate acid ester;

wherein viscosity of uncured sealant composition is less than 100 mPa·s.

19. The composition of claim 18, wherein said (i) polyester diol is poly(3-methyl-1,5-pentanediol adipate).

20. The composition of claim 18, wherein said (i) polyester diol is a reaction product of neopentyl glycol and a diol adipate, the diol adipate containing at least 3 carbons.

21. The composition of claim 18, wherein (a) the hydrophobic moiety includes monomers containing a $C_4$-$C_{20}$ alkyl groups; and wherein equivalent weight of the polyester diol to the toluene diisocyanate is in a ratio of about 1.0 to 4.0 parts diol to about 1.0 to 4.0 parts diisocyanate.

22. The composition of claim 21, wherein equivalent weight of the polyester diol to the toluene diisocyanate is in a ratio of about 1.0 parts diol to about 2.0 parts diisocyanate.

23. The composition of claim 18, wherein
   (a) the at least two (meth)acrylic monofunctional monomers containing a hydrophobic moiety are present in a total amount of about 20 to 60 wt. % based on the total weight of the sealant composition;
   (b) the at least one (meth)acrylic monofunctional monomer containing a hydroxyl group is present in an amount of about 5 to about 33 wt. % based on total weight of the composition;
   (c) the at least one modified polyester urethane methacrylate resin has a molecular weight of 12000 to about 18000 g/mol, and is present in an amount of about 10 to 30 wt. % based on total weight of the composition; and
   (d) the triallylisocyanurate, triallylcyanurate, or derivatives thereof, or a combination thereof, is present in an amount of about 5 to 15 wt. % based on total weight of the composition.

24. A method of manufacturing an anaerobically curable composition comprising:
   step a) providing (a) at least two (meth)acrylic monofunctional monomers containing a $C_4$-$C_{20}$ alkyl hydrophobic moiety and (b) at least one (meth)acrylic monofunctional monomer containing a hydroxyl group, wherein (a) comprises lauryl (meth)acrylate and trimethylcyclohexyl (meth)acrylate; and
   step b) combining said monomers with (c) at least one modified polyester urethane methacrylate resin having a weight average molecular weight of from about 8000 to about 18000 g/mol, and (d) triallylisocyanurate, triallylcyanurate, or derivatives thereof, or a combination thereof; wherein a reaction weight ratio of equivalents of the modified polyester urethane methacrylate resin to (meth)acrylic monomers containing a hydrophobic moiety and (meth)acrylic monofunctional monomers containing a hydroxyl group is about 1:0.5 to about 1:6.

25. The method of claim 24, wherein (a) the (meth)acrylic monofunctional monomers containing the hydrophobic moiety further comprises one or more monomers having $C_6$-$C_{12}$ alkyl groups, and combinations thereof.

26. The method of claim 24, wherein (a) the methacrylic monofunctional monomer containing the hydrophobic moiety further comprises monomer selected from the group consisting of 2-ethylhexyl (meth)acrylate, isobornyl (meth)acrylate, cyclohexyl (meth)acrylate, tetrahydrofurfuryl (meth)acrylate, and combinations thereof.

27. The method of claim 24, wherein (b) is a hydroxyalkyl (meth)acrylates having from $C_1$ to $C_{10}$ carbon atoms in the alkyl group.

28. The method of claim 24, wherein (b) is selected from the group consisting of hydroxyethyl methacrylate (HEMA), hydroxypropyl methacrylate (HPMA), and combinations thereof.

29. The method of claim 24, wherein (c) the at least one modified polyester urethane methacrylate resin has a weight average molecular weight of from about 12000 to about 18000 g/mol and a glass transition temperature less than −40° C.

30. An article of manufacture impregnated with a heat curable composition according to claim 1, said article comprising a porous metal surface and a plastic surface.

31. The article according to claim 30, wherein said article is an electrical component.

* * * * *